United States Patent [19]
Dean, Jr.

[11] Patent Number: 5,230,442
[45] Date of Patent: Jul. 27, 1993

[54] OIL SPOUT AND CONTAINER ASSEMBLY

[76] Inventor: Garland E. Dean, Jr., 61475 Sandalwood Ter., Joshua Tree, Calif. 92252

[21] Appl. No.: 939,661

[22] Filed: Sep. 3, 1992

[51] Int. Cl.⁵ .............................................. B67D 1/16
[52] U.S. Cl. ................................... 222/108; 222/153; 222/530; 222/571; 239/121
[58] Field of Search ............... 222/529, 530, 538, 545, 222/153, 108, 109, 571; 239/121

[56] References Cited

U.S. PATENT DOCUMENTS

| | | | |
|---|---|---|---|
| 2,087,139 | 7/1937 | Cameron | 239/121 X |
| 2,768,032 | 10/1956 | Gebauer | 239/121 |
| 2,801,771 | 8/1957 | Sethne et al. | 222/108 |
| 3,015,418 | 1/1962 | Hornston | 222/108 |
| 3,298,577 | 1/1967 | Chlystun | 222/530 X |
| 4,073,413 | 2/1978 | Tabler et al. | 222/530 X |
| 4,437,583 | 3/1984 | O'Connor | 222/108 |
| 4,726,491 | 2/1988 | Moon | 222/530 X |
| 4,817,832 | 4/1989 | Nagy | 222/530 |
| 5,131,571 | 7/1992 | Nolley | 222/108 X |

Primary Examiner—Gregory L. Huson
Attorney, Agent, or Firm—Leon Gilden

[57] ABSTRACT

A container includes an oil spout mounted to a neck of the container, with the spout including an accordion pleated spout hanging conduit permitting telescoping projection of the spout relative to the neck, with a cap seal mounted at an entrance of the neck, with the cap seal having a cap seal first end fixedly mounted to the spout exit opening, with a cap seal second end having a pull tab for initial pulling and separation of the cap seal relative to the spout exit opening.

1 Claim, 4 Drawing Sheets

OIL SPOUT AND CONTAINER ASSEMBLY

BACKGROUND OF THE INVENTION

1. Field of the Invention

The field of invention relates to pouring container apparatus, and more particularly pertains to a new and improved oil spout and container assembly wherein the same permits projection of a spout relative to the container to effect ease of dispensing oil from an associated container.

2. Description of the Prior Art

Container apparatus of various types have been utilized in the prior art for the delivery of fluids, and more specifically to the delivery of oil relative to an engine and the like receiving the oil. Spout structure specifically is noted in U.S. Pat. No. 4,832,238 to Taylor having an accordion pleated central portion.

U.S. Pat. No. 5,005,732 to Penn utilizes an oil can spout with a flow control in association with the spout.

As such, it may be appreciated there continues to be a need for a new and improved oil spout and container assembly as set forth by the instant invention which addresses both the problems of ease of use as well as effectiveness in construction and further providing advantages over the prior art by providing for an oil spout assembly readily mounted in a telescoping fashion relative to an associated container and in this respect, the present invention substantially fulfills this need.

SUMMARY OF THE INVENTION

In view of the foregoing disadvantages inherent in the known types of oil spout dispensing apparatus now present in the prior art, the present invention provides an oil spout and container assembly wherein the same is arranged to permit projection and access to an oil spout relative to a container for dispensing of fluid therefrom. As such, the general purpose of the present invention, which will be described subsequently in greater detail, is to provide a new and improved oil pout and container assembly which has all the advantages of the prior art oil delivery apparatus and none of the disadvantages.

To attain this, the present invention provides a container including an oil spout mounted to a neck of the container, with the spout including an accordion pleated spout hanging conduit permitting telescoping projection of the spout relative to the neck, with a cap seal mounted at an entrance of the neck, with the cap seal having a cap seal first end fixedly mounted to the spout exit opening, with a cap seal second end having a pull tab for initial pulling and separation of the cap seal relative to the spout exit opening.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved oil spout and container assembly which has all the advantages of the prior art oil container apparatus and none of the disadvantages.

It is another object of the present invention to provide a new and improved oil spout and container assembly which may be easily and efficiently manufactured and marketed.

It is a further object of the present invention to provide a new and improved oil spout and container assembly which is of a durable and reliable construction.

An even further object of the present invention is to provide a new and improved oil spout and container assembly which is susceptible of a low cost of manufacture with regard to both materials and labor, and which accordingly is then susceptible of low prices of sale to the consuming public, thereby making such oil spout and container assemblies economically available to the buying public.

Still yet another object of the present invention is to provide a new and improved oil spout and container assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
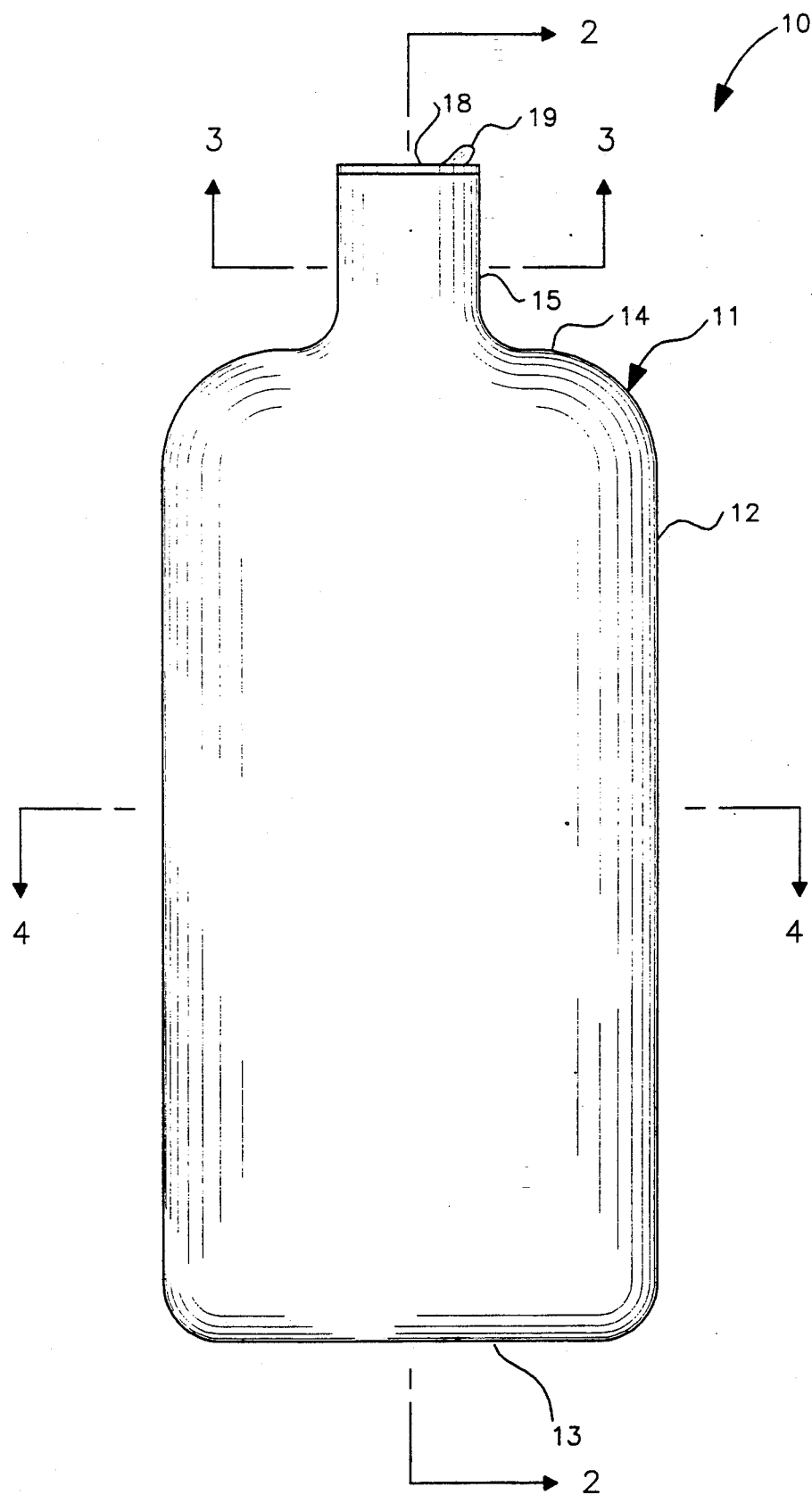
FIG. 1 is an orthographic view, taken in elevation, of the invention.
Figure 2:
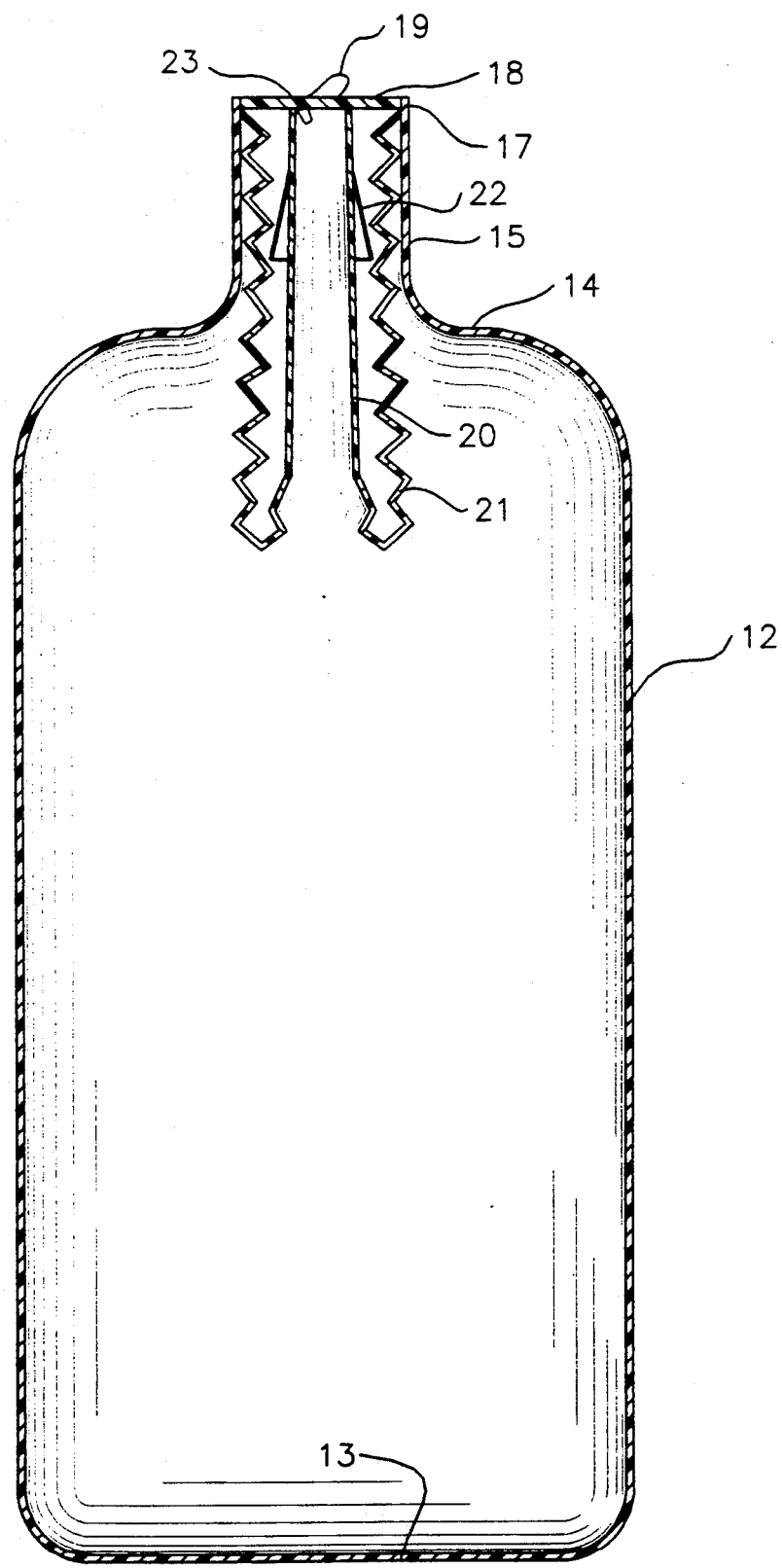
FIG. 2 is an orthographic view, taken along the lines 2—2 of FIG. 1 in the direction indicated by the arrows.
Figure 3:
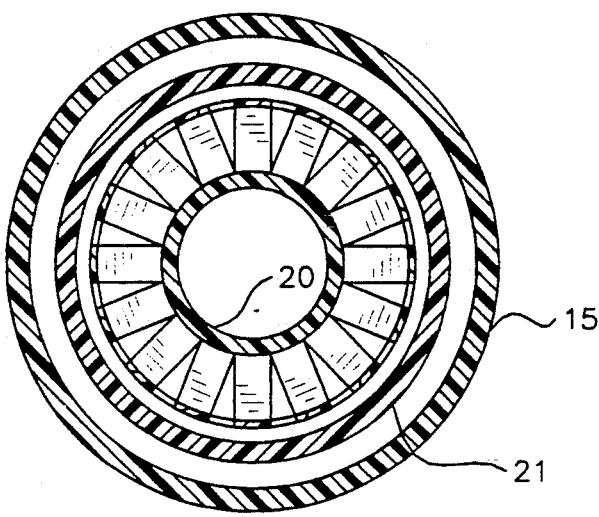
FIG. 3 is an orthographic view, taken along the lines 3—3 of FIG. 1 in the direction indicated by the arrows.
Figure 4:
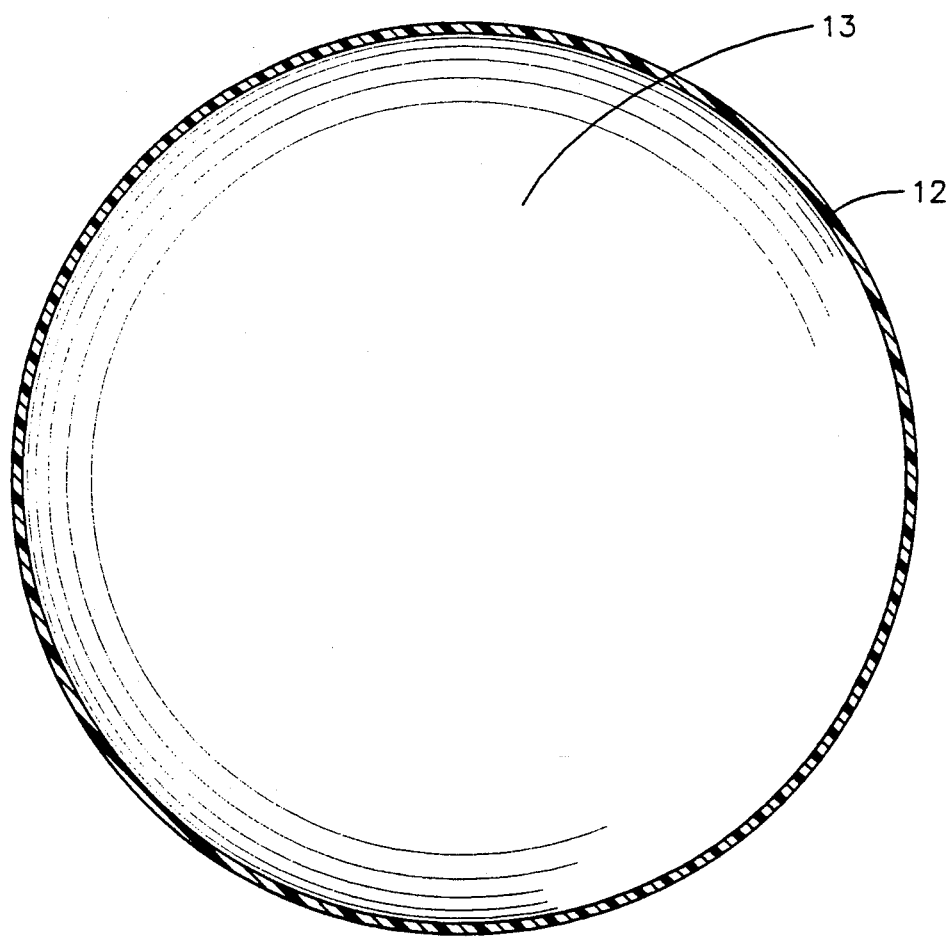
FIG. 4 is an orthographic view, taken along the lines 4—4 of FIG. 1 in the direction indicated by the arrows.

With reference now to the drawings, and in particular to FIGS. 1 to 5 thereof, a new and improved oil spout and container assembly embodying the principles and concepts of the present invention and generally designated by the reference numeral 10 will be described.

Figure 5:
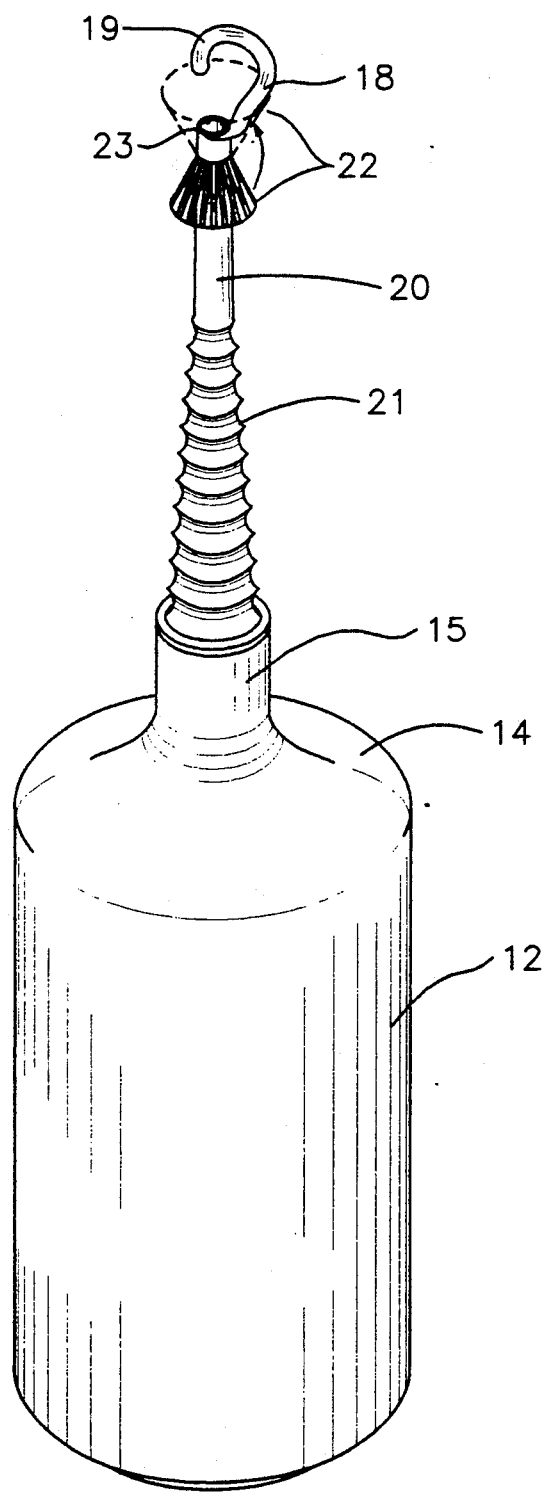
FIG. 5 is an isometric illustration of the invention in an operative configuration, with the spout projected relative to the neck portion of the associated container.

More specifically, the oil spout and container assembly 10 of the instant invention essentially comprises a fluid impermeable container 11 having a continuous side wall 12, a floor 13, and a top wall 14. Extending through the top wall 14 in fluid communication with interior cavity portion of the container 11 is a cylindrical neck 15 of a first diameter. The neck 15 is formed to include a neck annular free end 17 spaced from the container top wall 14. A cylindrical spout 20 of a second diameter less than the first diameter is positioned coaxially within the cylindrical neck 15 projecting into the container 11 below the top wall 14. An accordion pleated spout connecting conduit 21 connects the spout 20 to the neck annular free end 17 of the neck 15. A cap seal 18 is provided having a first end and a second end, with the first end secured to a spout exit opening 23 of the spout 20, with the seal 18 having a second end terminating in a pull tab 19. The neck cap seal 18 provides for fluid closure of the neck annular free end 17 preventing fluid flow therefrom, whereupon lifting of the pull tab 19 having its first end secured to the spout exit opening 23 effects projection of the spout 20 and the connecting conduit 21 relative to the neck 15, and more specifically relative to the neck free end 17, in a manner as indicated in FIG. 5. In this manner, fluid, and particularly oil, may be directed from the container 11 and into an associated engine (not shown) of conventional construction to provide for fluid filling thereof. A resilient pleated conical shield 22 is mounted to the spout 20 spaced from the exit opening 23 and in a first position, directed below the exit opening 23, wherein a second position, the resilient conical shield 22 is lifted to a second position (see FIG. 5, in phantom), wherein the shield 22 is directed above the spout exit opening 23. In this manner, fluid drainage is prevented from being directed along the spout and neck onto an individual's hands and into a surrounding area to provide for a minimum of oil loss and soiling relative to a surrounding area in use, maintaining the oil relative to the exit opening 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An oil spout and container assembly, comprising,
   a container, the container having a continuous side wall, a container floor, and a container top wall, and
   a cylindrical neck fixedly mounted to the top wall extending beyond the top wall, with the cylindrical neck having a first diameter, and
   a cylindrical spout mounted within the cylindrical neck having a second diameter less than the first diameter, wherein the cylindrical spout includes an accordion pleated spout connecting conduit, the cylindrical neck includes a neck annular free end, and the accordion pleated spout connecting conduit mounted at a conduit first end to the neck annular free end, and a conduit second end to the cylindrical spout, and
   the cylindrical spout and the connecting conduit are positioned within the container below the neck annular free end in a first position, and wherein the cylindrical spout and the connecting conduit project beyond the neck annular free end in a second position, and
   the spout includes a spout exit opening, and a neck cap seal, the neck cap seal sealingly directed over a rear end within the neck annular free end and having a cap seal first end and a cap seal second end, wherein the cap seal first end is secured to the spout exit opening, and the cap seal second end terminating in a pull tab, wherein the pull tab projects beyond the cap seal in a first position, wherein the cap seal is sealingly directed within the neck annular free end, and wherein the cap seal and the pull tab are separated from the neck annular free end in the second position, and
   a resilient conical shield, wherein the conical shield is mounted to the cylindrical spout below the spout exit opening, and the conical shield projects beyond the spout exit opening in a second position preventing backflow of oil from within the container directed along the spout.

* * * * *